UNITED STATES PATENT OFFICE.

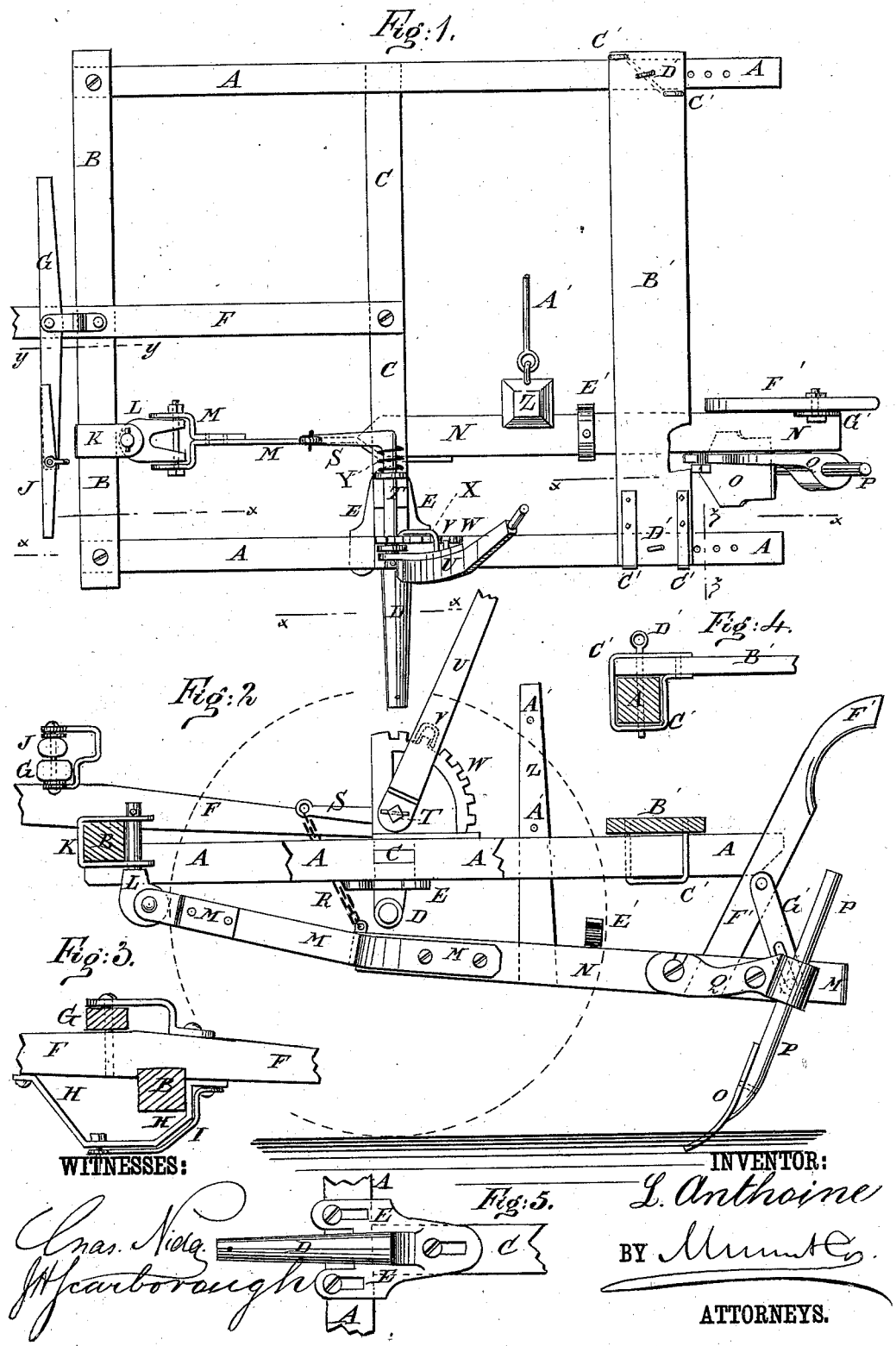

LOUIS ANTHOINE, OF EPWORTH, IOWA.

IMPROVEMENT IN CULTIVATORS.

Specification forming part of Letters Patent No. 199,680, dated January 29, 1878; application filed October 30, 1877.

*To all whom it may concern:*

Be it known that I, LOUIS ANTHOINE, of Epworth, in the county of Dubuque and State of Iowa, have invented a new and useful Improvement in Cultivators, of which the following is a specification:

Figure 1 is a top view of my improved cultivator, one of the plow-beams being omitted. Fig. 2 is a side view of the same, partly in section, through the irregular line $x\,x\,x\,x$, Fig. 1. Fig. 3 is a detail cross-section of the front bar of the frame, taken through the line $y\,y$, Fig. 1. Fig. 4 is a detail cross-section of a side bar of the frame, taken through the line $z\,z$, Fig. 1. Fig. 5 is an under-side view of the axle, and the part of the frame to which it is attached.

Similar letters of reference indicate corresponding parts.

The object of this invention is to furnish an improved cultivator which shall be simple in construction, convenient in use, reliable and effective in operation, and easily adjusted, as circumstances may require.

The invention will first be described in connection with the drawing, and then pointed out in the claim.

A are the side bars of the frame, the forward ends of which are rabbeted upon their upper sides to receive the ends of the front cross-bar B, which is secured to them by bolts. To the side bars A, a little in front of their centers, are framed the ends of the cross-bar C, called by me the "axle-bar."

D are the axle-arms, upon the bases of which are formed plates E. The plates E have three slots formed in them longitudinally with the axle-arms D, to receive the bolts by which the said axle-arms are secured to the bars A C of the frame, so that the wheels may be conveniently adjusted wider apart or closer together, as may be required.

F is the tongue, which is bolted to the upper sides of the front bar B and axle-bar C. This construction gives the tongue F an upward inclination, so that its forward end may rest in the neck-yoke ring, while the frame A B C remains level.

G is the double-tree, which is secured to the upper side of the tongue F by a bolt and hammer-strap.

H is a bar, which is placed beneath the front cross-bar B, and its ends are bent upward, and are bolted to the under side of the tongue F in front and rear of the cross-bar B. The bar H is provided with a hammer-strap, I, and bolt, so that the double-tree G may be attached to the bar H to lower the point of draft attachment, and adapt the machine to be used as a walking-cultivator.

J are the whiffletrees, which are attached to the upper side of the ends of the double-tree G, so that still other adjustments of the point of draft attachment may be obtained by reversing the said double-tree, the whiffletree-hooks being so formed as not to become unhooked from the traces whichever side may be up.

K are U-shaped bars or straps, which are passed around the forward side of the front cross-bar B. The ends of the bars K project, and have holes formed through them to receive the pivots L, upon the lower ends of which are formed lugs to receive the forked forward end of the bar M. The rear end of the bar M is bolted to the side of the forward end of the plow-beam N. The bar M is made with an offset at the forward end of the plow-beam N, to bring it into line with the central line of the said beam, and is bent so as to incline upward from the end of the plow-beam to the pivot or swivel pin L, so that the said plow-beam may be level.

O are the plows, which are secured to the lower ends of the standards P by a single bolt, the lower ends of the said standard being so formed as to fit against the rear side of the said plows.

The standards P are made round, and pass through holes in the rear ends of the castings Q, which are bolted to the sides of the beams N. The rear ends of the castings or holders Q stand out a little to bring the plows connected with the opposite sides of the beams to the proper distance apart. The standards P are secured adjustably in the holes in the castings Q by set-screws, which set-screws are not shown in the drawings.

The holders Q are secured to the beams N by two bolts, the rear one passing through a hole in the said holder, and the forward one passing through a slot leading in from its upper edge, so that the pitch of the plows can be readily adjusted.

To the forward part of the plow-beam N is attached the lower end of a short chain, K, the other end of which is attached to the end of a crank-arm, S, formed upon or attached to the inner end of a short shaft, T.

The shaft T works in bearings attached to the axle-bar C and the side bar A, and to its outer end is attached a lever, U, which projects, and is bent or inclined inward into such a position that it may be readily reached and operated by the driver from his seat.

Upon the inner side of the lower part of the lever U is formed, or to it is attached, a U-shaped projection, V, the ends of which engage with the teeth of the segmental ratchet-wheel W, attached to or formed in one piece with the outer bearing of the shaft T.

The lever U is kept from being drawn too far away from the ratchet W by the keeper X, which passes around the curved bar of the said ratchet W, and its ends are attached to the said lever U. The lever U is held up against the ratchet W, holding the projections V in gear with the said ratchet W, by a spiral spring, Y, coiled around the inner part of the shaft T, between the inner bearing of the said shaft and the crank-arm S.

With this construction, by moving the free end of the lever U outward, the projection V will be withdrawn from the teeth of the ratchet W, allowing the said lever U to be moved to raise the plows from and lower them to the ground, and to adjust them to work at any desired depth in the ground.

To the plow-beams N, a little in the rear of the axle-bar C, are attached the lower ends of the uprights Z, to the inner sides of which are pivoted the ends of two rods, A'. The rods A' of the two uprights Z are designed to overlap and be secured to each other adjustably by clasps.

B' is the seat-board, the ends of which rest upon the rear ends of the side bars A, and have keepers C' attached to them, which pass around the said side bars A.

Two keepers, C', may be attached to each end of the seat-board B', as shown at the left-hand end of said seat-board, or only one, as shown at the right-hand end of said seat-board. In the latter case the keeper C' should cross the side bars A diagonally.

The seat-board B' is kept in place upon the side bars A by pins D', passing through the said board and side bars, as shown in Fig. 4.

Several holes are formed in the side bars A to receive the pins D', so that the seat-board B' may be adjusted as required, to enable the driver to balance the machine with his weight, whether he be heavy or light.

With this construction, the seat-board B' may be placed upon or hung below the side bars A, as the size of the driver may require.

To the plow-beams N, in front of the seat-board B', are attached rests E', to receive the driver's feet, and enable him to guide the plows with his feet.

A number of holes are formed in the plow-beams N to receive the feet-rests E', so that they may be adjusted to correspond with the seat-board B'. The plow-beams N are provided with handles F', to adapt the machine to be used as a walking-cultivator. The handles F' are bolted to the side of the rear part of the plow-beams N, and are supported at the proper height by the braces G', the upper ends of which are bolted to the said handles, and their lower ends are slotted to receive the bolts by which they are secured to the rear end of the plow-beams N, so that the handles F' can be readily adjusted according to the height of the plowman.

Having thus described my invention, I claim as new and desire to secure by Letters Patent—

The combination, with cross-bar B, of a plow-beam, N, connected therewith by the U-bar K, lug-pivot L, and offsetted bar M, substantially as and for the purpose specified.

LOUIS ANTHOINE.

Witnesses:
JOHN ANTHOINE,
ROBERT HAENNIG.